(12) United States Patent
Oikawa et al.

(10) Patent No.: US 11,345,021 B2
(45) Date of Patent: May 31, 2022

(54) ARM FIXING DEVICE

(71) Applicant: FANUC CORPORATION, Yamanashi (JP)

(72) Inventors: Akihiro Oikawa, Yamanashi (JP); Yuuki Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 314 days.

(21) Appl. No.: 16/832,513

(22) Filed: Mar. 27, 2020

(65) Prior Publication Data

US 2020/0368895 A1    Nov. 26, 2020

(30) Foreign Application Priority Data

May 24, 2019   (JP) .............................. JP2019-097821

(51) Int. Cl.
   *B25J 19/00*   (2006.01)
   *B25J 19/06*   (2006.01)
   *B25J 9/00*    (2006.01)

(52) U.S. Cl.
   CPC ......... *B25J 9/0096* (2013.01); *B25J 19/0004* (2013.01); *B25J 19/0066* (2013.01); *B25J 19/06* (2013.01)

(58) Field of Classification Search
   CPC ..... B25J 19/0066; B25J 19/06; B25J 19/0004
   USPC ....................................................... 248/674
   See application file for complete search history.

(56) References Cited

U.S. PATENT DOCUMENTS

| 8,464,413 B1* | 6/2013 | Prater | .................... B25B 27/02 29/244 |
| 2013/0320184 A1* | 12/2013 | Rachuy | .................... H02K 5/24 248/638 |
| 2015/0246450 A1 | 9/2015 | Yoneda | |
| 2017/0157979 A1* | 6/2017 | Polka | ..................... B60B 7/068 |
| 2018/0319010 A1 | 11/2018 | Chikara et al. | |

FOREIGN PATENT DOCUMENTS

| JP | 2004-291116 A | 10/2004 |
| JP | 2013-056376 A | 3/2013 |
| JP | 2015-163414 A | 9/2015 |
| JP | 2016-187858 A | 11/2016 |
| JP | 2018-187711 A | 11/2018 |
| WO | 2016/158614 A1 | 10/2016 |

\* cited by examiner

*Primary Examiner* — Jermie E Cozart
(74) *Attorney, Agent, or Firm* — Maier & Maier, PLLC

(57) ABSTRACT

An arm fixing device that fixes a first arm to a support member, the movable arm being pivotally supported on a base about a second axis, the movable arm being driven to pivot about the second axis by power of a servomotor, the arm fixing device including: an attachment portion that is position-adjustable in a circumferential direction and detachably attached to the base; a pair of protrusion fixing portions that, in a state in which the attachment portion is attached to the base, extend in a radial direction with respect to a second axis and are disposed at positions interposing a protruding portion therebetween in the circumferential direction, the protruding portion being provided in the first arm and protruding in the second axis direction; and a connecting portion 13*b* that connects the distal ends of the protrusion fixing portions to each other.

6 Claims, 7 Drawing Sheets

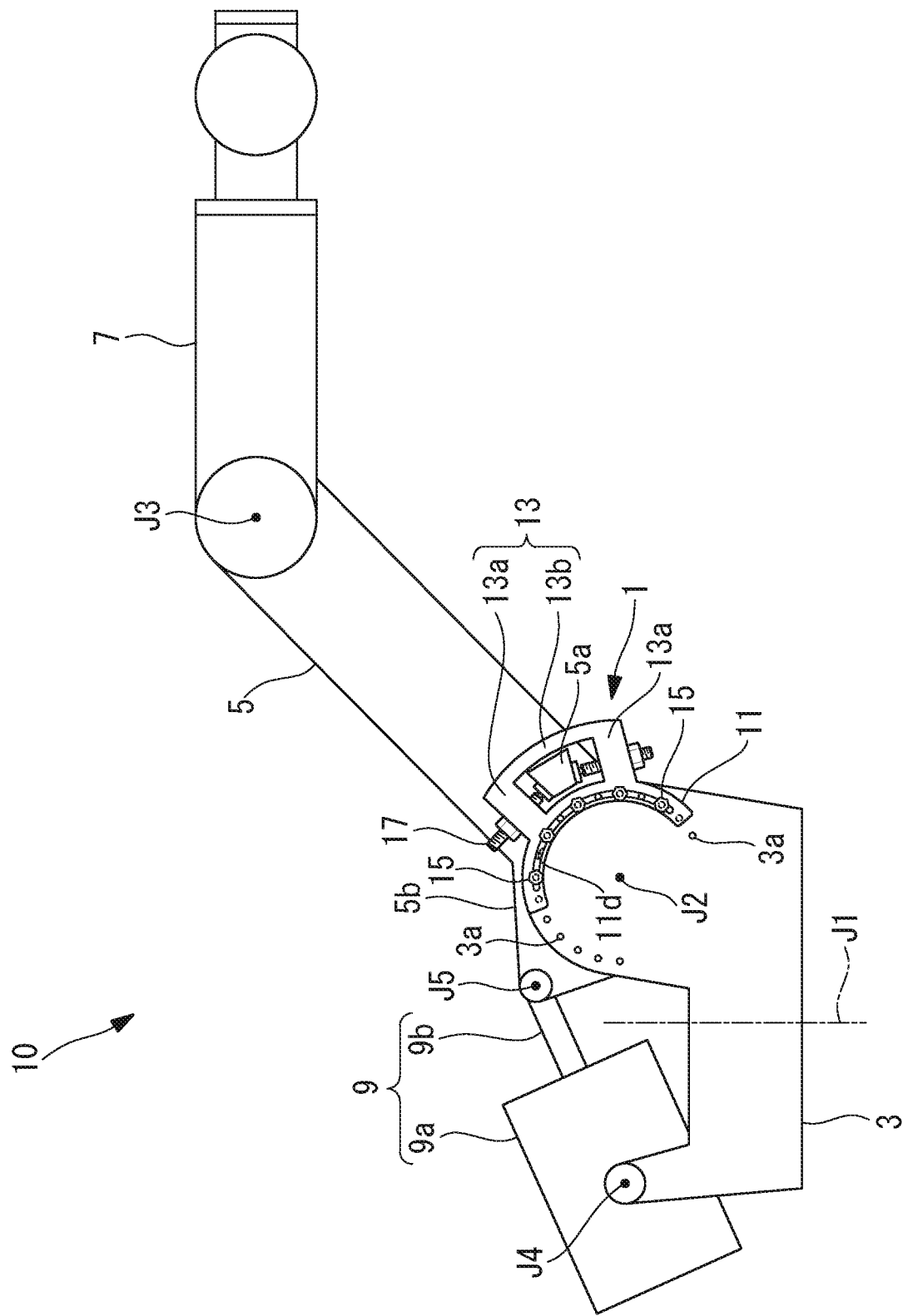

ARM FIXING DEVICE

CROSS-REFERENCE TO RELATED APPLICATIONS

This application is based on Japanese Patent Application No. 2019-097821, the content of which is incorporated herein by reference.

FIELD

The present disclosure relates to an arm fixing device.

BACKGROUND

To date, among industrial robots, there is a known robot provided with a fixing device that, in the case where a servomotor is to be replaced due to a failure or the like, fixes an arm by abutting a stopper against the arm in order to temporarily prevent the arm, instead of the servomotor, from coming off (for example, Japanese Unexamined Patent Application, Publication No. 2015-163414). In the case where the robot includes a gravity balance device, it is not known in which direction the arm will pivot about its axis when the servomotor is being replaced. Therefore, the robot described in Japanese Unexamined Patent Application, Publication No. 2015-163414 has a structure in which a pair of stoppers can support both sides of the arm in the pivot direction.

SUMMARY

An arm fixing device that fixes a movable arm to a support member, the movable arm being pivotally supported on the support member about a horizontal axis, the movable arm being driven to pivot about the axis by the power of a servomotor, the arm fixing device including an attachment portion that is position-adjustable in a circumferential direction and detachably attached to one of the support member and the movable arm, a pair of protrusion fixing portions that, in a state where the attachment portion is attached to one of the support member and the movable arm, extend in a radial direction with respect to the axis and that are disposed at positions interposing a protruding portion therebetween in the circumferential direction, the protruding portion being provided on another of the support member and the movable arm and protruding in the axis direction, and a connecting portion that connects distal ends of the protrusion fixing portions to each other.

BRIEF DESCRIPTION OF DRAWINGS

FIG. 7 is a side view illustrating the appearance of a robot to which an arm fixing device according to a modification of the embodiment of the present disclosure has been attached.

DETAILED DESCRIPTION

An arm fixing device according to an embodiment of the present disclosure will be described below with reference to the drawings.

Figure 1:
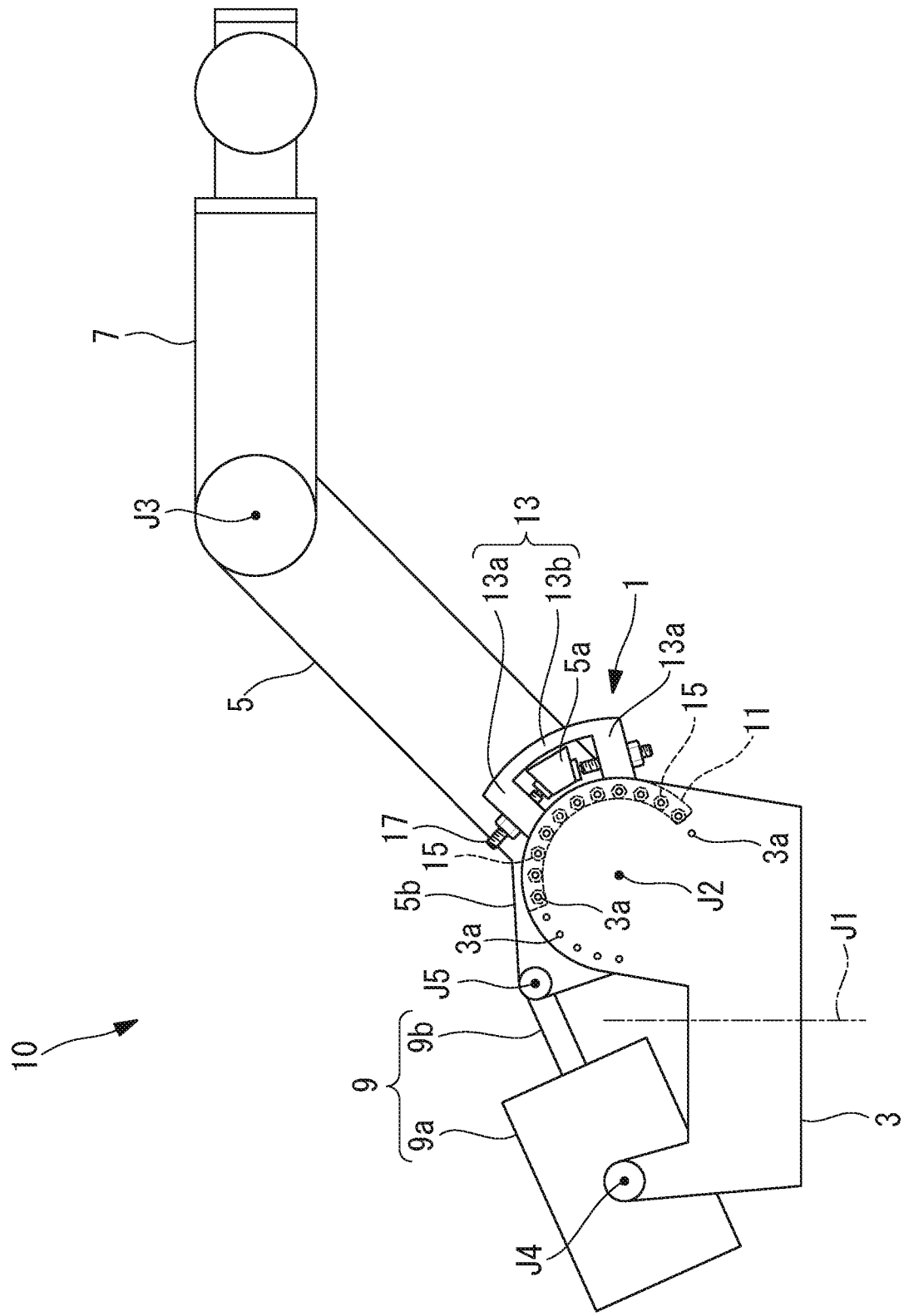
FIG. 1 is a side view illustrating the appearance of a robot to which an arm fixing device according to an embodiment of the present disclosure has been attached.
Figure 2:
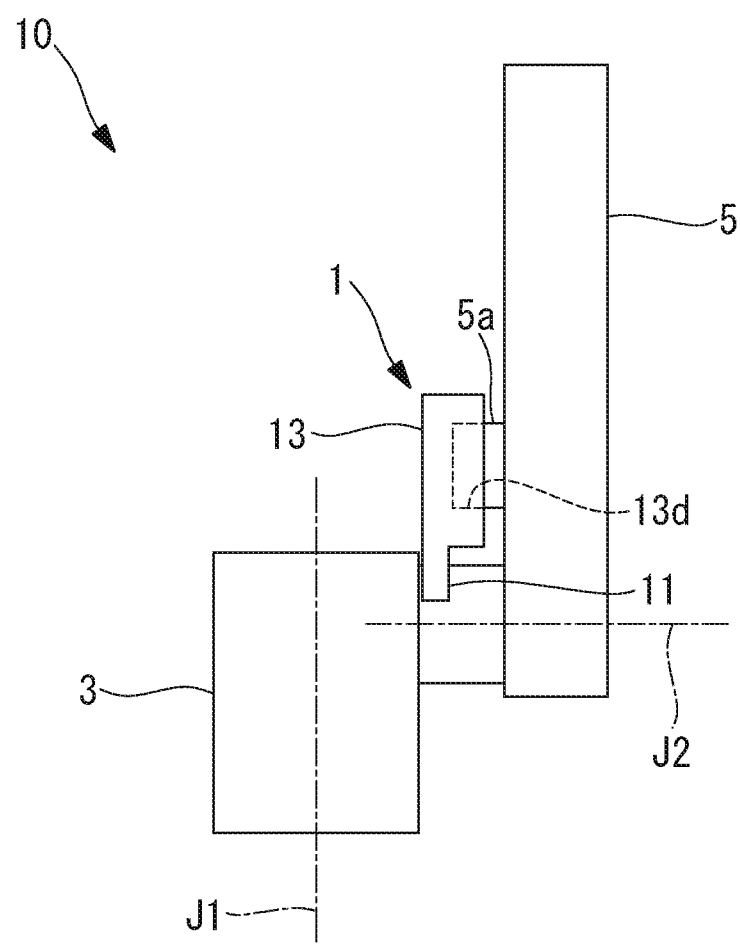
FIG. 2 is a front view of the arm fixing device and the robot in FIG. 1 as viewed from a direction perpendicular to a second axis.

As illustrated in FIGS. 1 and 2, an arm fixing device 1 of the present embodiment is used for a robot 10 that includes a base (support member) 3 rotatably supported about a vertical first axis J1, a first arm (movable arm) 5 pivotally supported about a second axis J2 horizontal to the base 3, and a servomotor (not illustrated) that drives the first arm 5 so as to pivot about the second axis J2 with respect to the base 3, the arm fixing device 1 being a device that fixes the first arm 5 to the base 3. In the figure, reference sign 7 denotes a second arm supported by the first arm 5 so as to pivot about a third axis J3 parallel to the second axis J2, and reference sign 9 denotes a gravity balance device that reduces the load on the servomotor that drives the first arm 5 to pivot.

A plurality of screw holes 3a are provided in the vicinity of an upper end portion of the base 3. The plurality of screw holes 3a are arranged at a constant pitch in a circumferential direction on a circumference around the second axis J2.

The first arm 5 is pivotally supported by the base 3 in a cantilevered state. The first arm 5 is provided with a protruding portion 5a that protrudes in a direction along the second axis J2 on a side surface on the base 3 side. The protruding portion 5a is formed, for example, in a prismatic or cylindrical shape. Reference sign 5b denotes a balancer connecting portion of the first arm 5, the balancer connecting portion being connected to the gravity balance device 9.

The gravity balance device 9 includes a case 9a that is cylindrical and that is connected to the base 3 so as to be relatively pivotable about a fourth axis J4 parallel to the second axis J2, and a shaft 9b that protrudes from one end surface of the case 9a concentrically with the case 9a. A distal end portion of the shaft 9b is connected to the balancer connecting portion 5b of the first arm 5 so as to be relatively pivotable about a fifth axis J5 parallel to the fourth axis J4. An urging force of a coil spring (not illustrated) built into the case 9a acts on the shaft 9b. Consequently, since a force in a direction toward the case 9a is applied to the balancer connecting portion 5b of the first arm 5 by the urging force of the coil spring, the moment of gravity acting on the first arm 5 can be partially offset.

The arm fixing device 1 includes an attachment portion 11 that is position-adjustable and detachably attached to the base 3, and an arm support portion 13 that supports the first arm 5 in a state in which the attachment portion 11 is attached to the base 3.

Figure 3:
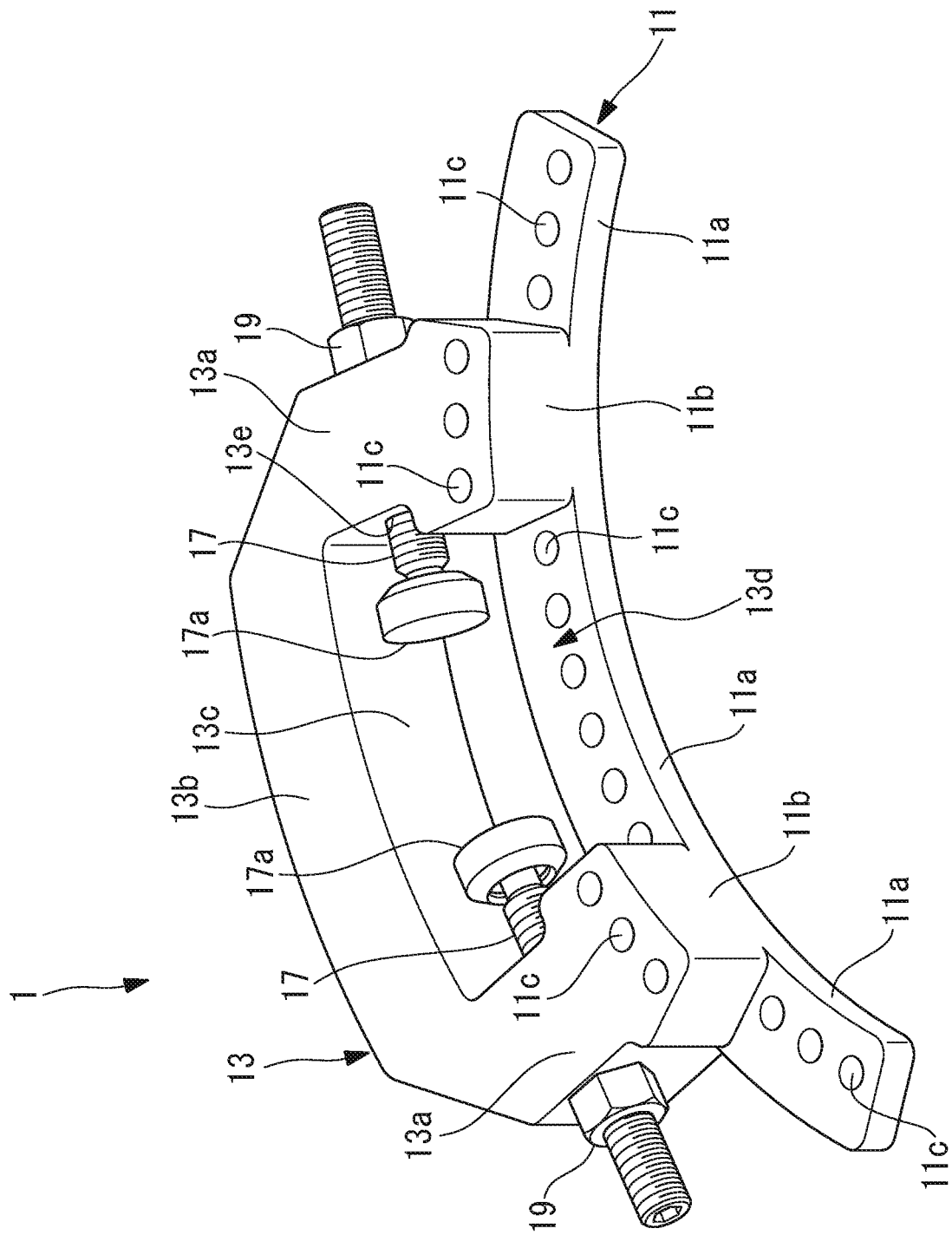
FIG. 3 is a perspective view of the arm fixing device in FIGS. 1 and 2 as viewed from a front side.
Figure 4:
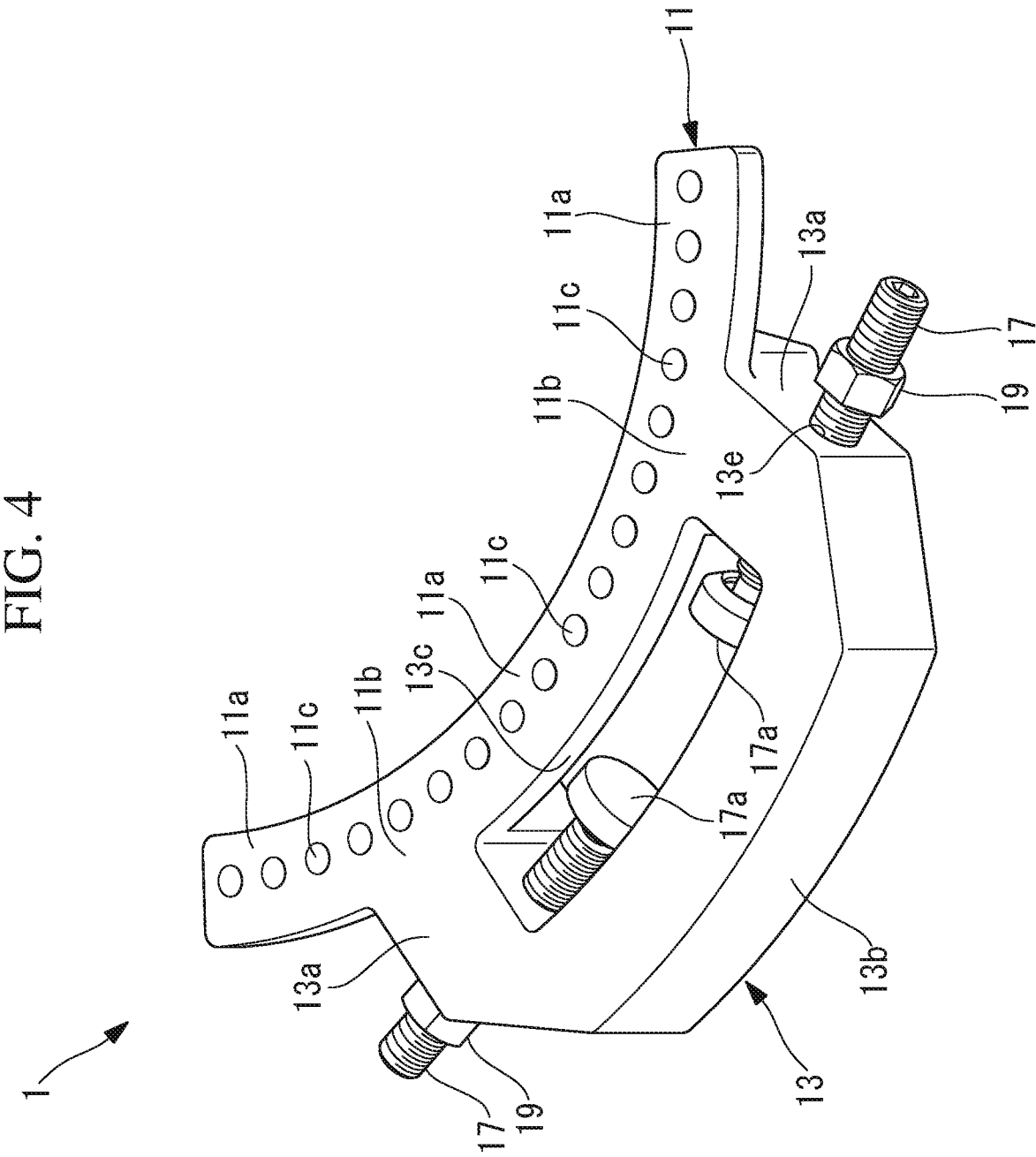
FIG. 4 is a perspective view of the arm fixing device in FIGS. 1 and 2 as viewed from an attachment surface side, which is a rear surface.

As illustrated in FIGS. 3 and 4, the attachment portion 11 has a plate-like shape extending in an arc shape with a predetermined curvature. The attachment portion 11 has a flat attachment surface on a rear surface thereof in a plate thickness direction. The attachment portion 11 has a shape in which thin portions 11a, which have a small thickness, and thick portions 11b, which rise in the plate thickness direction from a surface opposite to the attachment surface, are alternately arranged at intervals in the circumferential direction of the arc shape. The thick portions 11b are provided at two places in the circumferential direction with an interval therebetween.

In the attachment portion 11, a plurality of through holes 11c penetrating in the plate thickness direction are provided in both the thin portions 11a and the thick portions 11b at intervals in the circumferential direction of the arc shape. The plurality of through holes 11c are arranged on a circumference having the same radius as that along which the plurality of screw holes 3a of the base 3 are arranged and at the same pitch as the screw holes 3a.

The attachment portion 11 is fixed to the upper end portion of the base 3 by fastening a plurality of bolts 15 (see FIG. 1) in the screw holes 3a of the base 3 through the plurality of through holes 11c. The through holes 11c of the attachment portion 11 are provided in such a number as to generate a frictional force necessary for fixing the first arm 5 so as not to be displaced. In contrast, the screw holes 3a of the base 3 are provided in a number sufficiently larger than the number of through holes 11c of the attachment portion 11.

As illustrated in FIGS. 3 and 4, the arm support portion includes a pair of protrusion fixing portions 13a that extend from the two thick portions 11b of the attachment portion 11 in a radially outward direction from the arc shape of the attachment portion 11 and a connecting portion 13b that connects the distal ends of the pair of protrusion fixing portions 13a to each other. The pair of protrusion fixing portions 13a and the connecting portion 13b have the same thickness as the thick portions 11b of the attachment portion 11.

The arm support portion 13 has a through hole portion (window portion) 13c penetrating in the thickness direction between the connecting portion 13b and the attachment portion 11. The through hole portion 13c is surrounded by the pair of protrusion fixing portions 13a and the connecting portion 13b, and is continuous with a space formed by a step between the thick portion 11b and the thin portion 11a of the attachment portion 11.

A notch 13d into which the protruding portion 5a of the first arm 5 is inserted when the attachment portion 11 is attached to the base 3 is formed by a portion of a space in the depth direction of the through hole portion 13c and a space formed by the step between the thick portions 11b and the thin portion 11a of the attachment portion 11. The notch 13d has a sufficient depth and width to accommodate the protruding portion 5a.

The pair of protrusion fixing portions 13a are provided with fixing portion screw holes 13e that penetrate each of the protrusion fixing portions 13a in a direction intersecting the radial direction of the arc shape of the attachment portion 11. Screw members 17 that each have an abutment surface 17a at a longitudinal distal end thereof are fastened in each of the fixing portion screw holes 13e.

A female screw is formed on the inner peripheral surface of each of the pair of fixing portion screw holes 13e.

On the outer peripheral surface of each of the screw members 17, a male screw to be engaged with the female screw of a corresponding one of the fixing portion screw holes 13e is formed. The pair of screw members 17 have a length dimension longer than the fixing portion screw holes 13e. Each of the pair of screw members 17 is fastened in the corresponding one of the fixing portion screw holes 13e in such a direction that the abutment surface 17a is arranged in the notch 13d. It is possible to move the pair of screw members 17 forward and backward in directions in which the abutment surfaces 17a approach and separate from the protruding portion 5a of the first arm 5 inserted into the notch 13d.

The abutment surfaces 17a have a shape that can be in close contact with the side surfaces of the protruding portion 5a of the first arm 5. For example, the abutment surfaces 17a have a flat shape that matches a prismatic protruding portion 5a. In the case where the protruding portion 5a has a columnar shape, for example, the abutment surfaces 17a may be formed to have the same curvature as the curvature of the side surfaces of the protruding portion 5a.

By moving the pair of screw members 17 forward and backward, respectively, the positions of the pair of abutment surfaces 17a in the notch 13d can be changed. A locking nut 19 can be attached to each of the screw members 17 on the opposite side of the abutment surface 17a with the fixing portion screw hole 13e interposed therebetween.

Next, the operation of the arm fixing device 1 according to the present embodiment will be described.

In order to replace the servomotor of the robot 10 using the arm fixing device 1 having the above configuration, first, the screw members 17 fastened in the fixing portion screw holes 13e are withdrawn. In this state, as illustrated in FIGS. 1 and 2, in accordance with the pivot angle of the first arm 5 with respect to the base 3, the attachment surface of the attachment portion 11 is aligned with the side surface of the upper end portion of the base 3 on the first arm 5 side, and the protruding portion 5a of the first arm 5 is inserted into the notch 13d of the arm support portion 13.

Next, the through holes 11c of the attachment portion 11 are aligned with the screw holes 3a of the base 3, and the plurality of bolts 15 are fastened in the screw holes 3a of the base 3 via the through holes 11c of the attachment portion 11, respectively. The position of the protruding portion 5a can be viewed through the through hole portion 13c of the arm support portion 13.

Next, in accordance with the position of the protruding portion 5a in the notch 13d, each of the screw members 17 fastened in a corresponding one of the fixing portion screw holes 13e is advanced, and the pair of abutment surfaces 17a are respectively abutted on the two sides of the protruding portion 5a in the pivot direction of the first arm 5. The position of the protruding portion 5a that abuts the pair of abutment surfaces 17a can be viewed through the through hole portion 13c of the arm support portion 13.

When the servo motor is removed, depending on the difference between the magnitude of the torque at which the first arm 5 is about to fall due to gravity and the magnitude of the torque by which the gravity balance device 9 tries to lift the first arm 5, the first arm 5 tries to pivot about the second axis J2 in either the falling direction or the lifting direction.

In contrast, the abutment surfaces 17a held by the pair of protrusion fixing portions 13a are respectively abutted against the two sides of the protruding portion 5a in the pivot direction of the first arm 5 so that, regardless of which direction the first arm 5 pivots around the second axis J2 when replacing the servomotor, the pivot movement of the first arm 5 can be restricted.

In this case, since the distal ends of the pair of protrusion fixing portions 13a are connected by the connecting portion 13b, the load of the first arm 5 applied to one of the protrusion fixing portions 13a holding one of the abutment surfaces 17a arranged in the direction in which the first arm 5 pivots can be received by both of the pair of protrusion fixing portions 13a.

That is, by forming the pair of protrusion fixing portions 13a, which hold the pair of abutment surfaces 17a, in a closed shape, the load of the first arm 5 applied to one of the protrusion fixing portions 13a can be distributed over the two protrusion fixing portions 13a. This makes it possible to secure a strength capable of sufficiently withstanding the load of the first arm 5 in a small space without increasing the size of the device on the whole. Alternatively, the size can be significantly reduced as compared with an arm fixing device of the related art having the same strength.

In addition, the visibility at the time of attaching the attachment portion 11 to the base 3 and at the time of abutting the respective abutment surfaces 17a against the protruding portion 5a of the first arm 5 can be improved due to the through hole portion 13c of the arm support portion 13. In addition, with the attachment portion 11 attached to the base 3, the position of the pair of abutment surfaces 17a with respect to the protruding portion 5a of the first arm 5 in the notch 13d can be changed by merely moving the screw members 17 fastened in the respective fixing portion screw holes 13e.

In the present embodiment, the case where the thickness of the upper end portion of the base 3 is thick and the gap between the upper end portion of the base 3 and the first arm 5 is relatively wide is illustrated, and the arm fixing device 1 is installed between the upper end portion of the base 3 and the first arm 5. In the present embodiment, the arm support portion 13 has the through hole portion 13c; however, in this configuration, the arm support portion 13 does not need to be provided with the through hole portion 13c.

Further, in this embodiment, the screw holes 3a are provided in the base 3, and the bolts 15 are passed through the through holes 11c of the attachment portion 11 and fastened in the screw holes 3a of the base 3 so that the attachment portion 11 is fixed to the base 3. Instead of this, for example, nuts that can be fastened to the bolt 15 may be adopted, through holes may be provided at the upper end portion of the base 3 instead of the screw holes 3a, and the bolts 15 may be inserted from one side through the through holes of the base 3 and the through holes 11c of the attachment portion 11 in this order, and the nuts may be attached and fastened to the bolts 15 from the other side. Alternatively, at the upper end portion of the base 3, through holes may be provided instead of the screw holes 3a, and screw holes may be provided instead of the through holes 11c of the attachment portion 11, and the bolts 15 may be inserted into the through holes of the base 3 from one side and fastened in the screw holes of the attachment portion 11.

In the case where the thickness of the upper end portion of the base 3 is thin and the gap between the upper end portion of the base 3 and the first arm 5 is relatively narrow, the arm fixing device 1 may be installed on the upper end portion of the base 3 on the side opposite to the first arm 5 side. In this case, it is necessary to provide the arm support portion 13 with the through hole portion 13c. The through hole portion 13c only need have a sufficient depth and width to allow the protruding portion 5a of the first arm 5 to be inserted therein.

Figure 5:
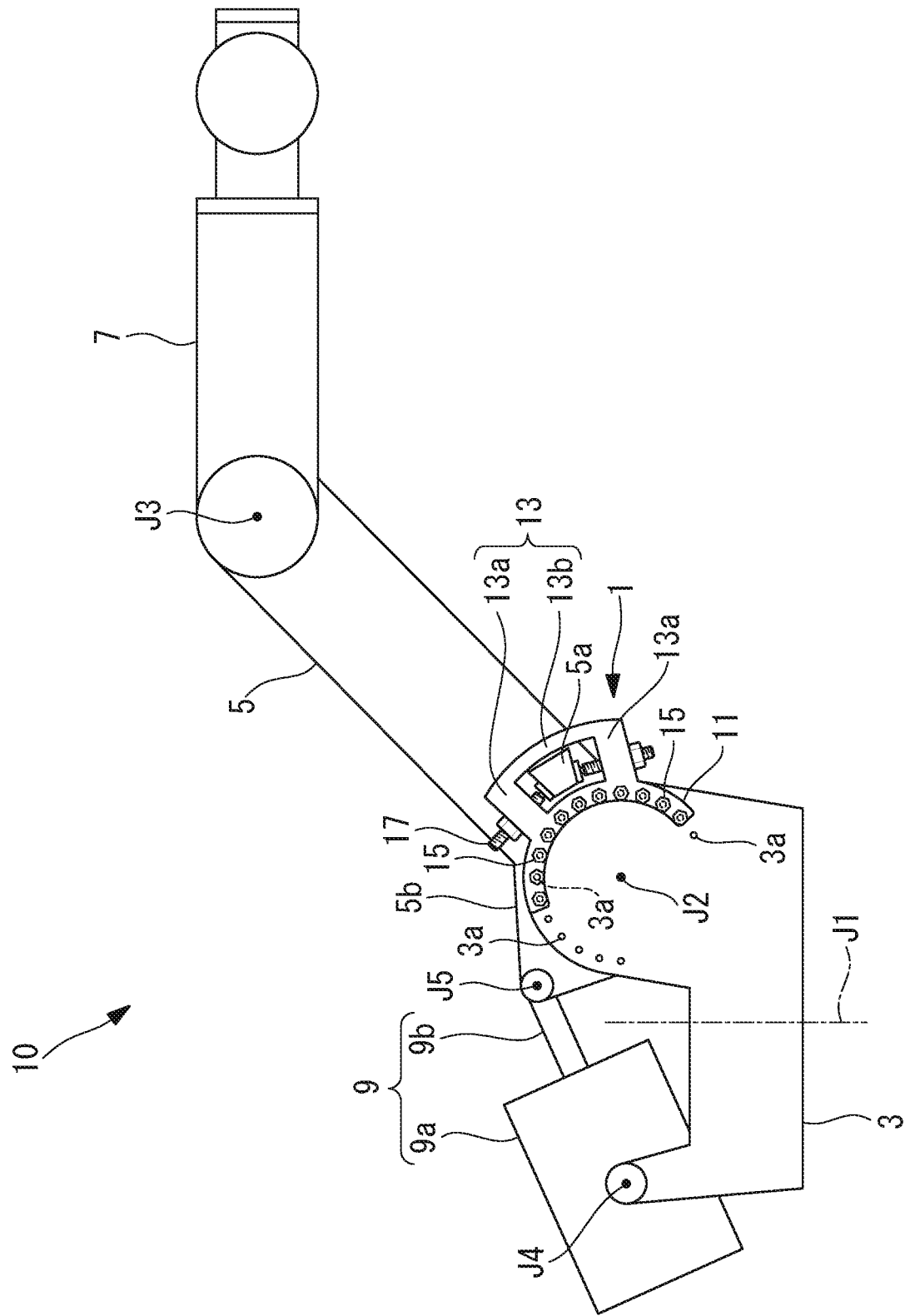
FIG. 5 is a side view illustrating the appearance of the robot in which the position where the arm fixing device in FIG. 1 is attached has been changed.
Figure 6:
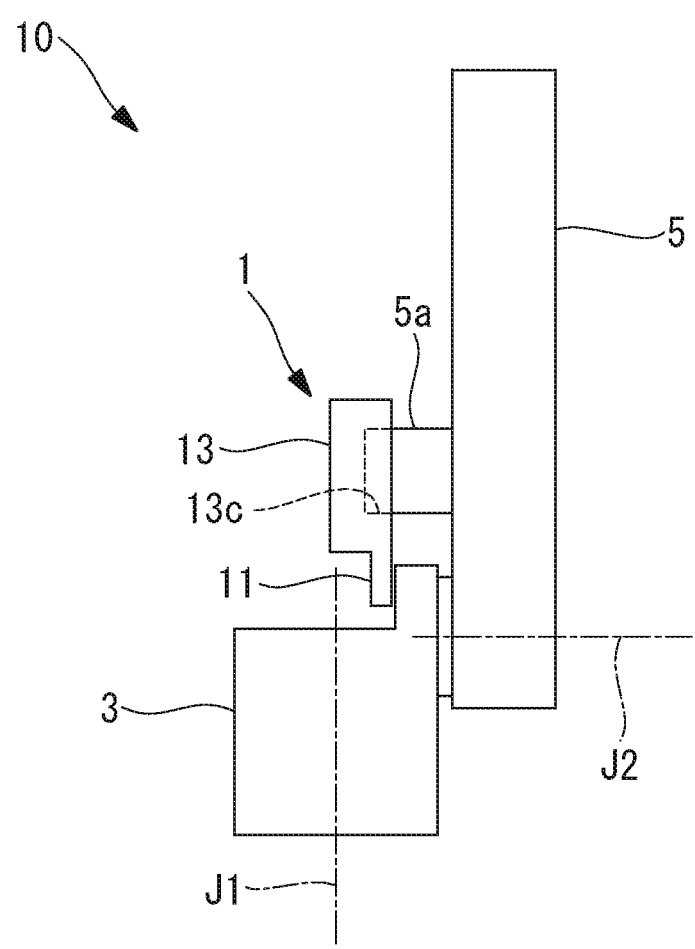
FIG. 6 is a front view of the arm fixing device and the robot in FIG. 5 viewed from a direction perpendicular to the second axis.

When the arm fixing device 1 is installed on the upper end portion of the base 3 on the side opposite to the first arm 5 side, in a state where each screw member 17 is withdrawn, for example, as illustrated in FIGS. 5 and 6, in accordance with the pivot angle of the first arm 5 with respect to the base 3, the attachment surface of the attachment portion 11 is aligned with the side surface of the upper end portion of the base 3 opposite to the first arm 5 side, and the protruding portion 5a of the first arm 5 is inserted into the through hole portion 13c of the arm support portion 13. In this case, the protruding portion 5a of the first arm 5 is inserted into the through hole portion 13c of the arm support portion 13 from the attachment surface side of the attachment portion 11.

Next, the plurality of bolts 15 are fastened in the screw holes 3a of the base 3 via the through holes 11c of the attachment portion 11, respectively. Next, in accordance with the position of the protruding portion 5a in the through hole portion 13c, each of the screw members 17 fastened in a corresponding one of the fixing portion screw holes 13e is advanced, and the pair of abutment surfaces 17a are made to abut against the two sides of the protruding portion 5a in the pivot direction of the first arm 5.

In this case also, the abutment surfaces 17a held by the pair of protrusion fixing portions 13a are respectively abutted against the two sides of the protruding portion 5a in the pivot direction of the first arm 5 so that, regardless of which direction the first arm 5 pivots around the second axis J2 when replacing the servomotor, the pivot movement of the first arm 5 can be restricted.

Thus, because the distal ends of the pair of protrusion fixing portions 13a are connected by the connecting portion 13b, the load of the first arm 5 applied to one of the protrusion fixing portions 13a holding one of the abutment surfaces 17a arranged in the direction in which the first arm 5 pivots can be received by both of the pair of protrusion fixing portions 13a.

This embodiment can be modified to the following configuration.

In the present embodiment, the attachment portion 11 has a plurality of through holes 11c, and the attachment position of the attachment portion 11 with respect to the base 3 is changed by changing which of the through holes 11c the bolts 15 are made to pass through. In place of the through holes 11c, for example, as illustrated in FIG. 7, the attachment portion 11 may include an elongated hole 11d extending in the pivot direction of the first arm 5 along a circumference having the same radius as the circumference along which the plurality of screw holes 3a of the base 3 are arranged.

According to the present modification, by changing the positions where the bolts 15 penetrate the inside of the elongated hole 11d, the attachment position of the attachment portion 11 with respect to the base 3 can be changed. Consequently, in accordance with the pivot angle of the first arm 5 with respect to the base 3, the positions of the pair of abutment surfaces 17a with respect to the protruding portion 5a of the first arm 5 can be changed by merely changing the positions at which the bolts 15 penetrate the inside of the elongated hole 11d of the attachment portion 11.

In this modification, without providing the fixing portion screw holes 13e penetrating each of the protrusion fixing portions 13a and the screw members 17 fastened in each of the fixing portion screw holes 13e, the abutment surfaces 17a may be formed by the inner surfaces of the pair of protrusion fixing portions 13a surrounding the notch 13d of the arm support portion 13 or the through holes 11c. In this case, the inner side surfaces of the pair of protrusion fixing portions 13a may be arranged at intervals slightly larger than the width of the protruding portion 5a in the pivot direction of the first arm 5.

According to the present modification, the attachment portion 11 is attached to the base 3 in a state where the pair of protrusion fixing portions 13a are arranged at positions flanking the protruding portion 5a in the circumferential direction. Consequently, the abutment surfaces 17a of the pair of protrusion fixing portions 13a can be abutted against the two sides of the protruding portion 5a in the pivot direction of the first arm 5, and the protruding portion 5a can be supported by the respective inner surfaces of the pair of protrusion fixing portions 13a.

In addition, in the present embodiment, the first arm 5 has the protruding portion 5a, the attachment portion 11 is attached to the base 3, and the pair of protrusion fixing portions 13a are arranged at positions flanking the protruding portion 5a of the first arm 5 in the circumferential direction. Instead of this, for example, the base 3 may have a protruding portion protruding in a direction along the second axis J2 on a side surface of the upper end portion of the base 3 on the opposite side to the first arm 5, the attachment portion 11 may be attached to the first arm 5, and the pair of protrusion fixing portions 13a may be disposed at positions flanking the protruding portion of the base 3 in the circumferential direction.

In addition, in the present embodiment, the base 3 and the first arm 5 are fixed, but instead, the second arm 7 and the first arm 5 may be fixed. In this case, the first arm 5 may be used as a support member and the second arm 7 may be used as a movable arm, or the second arm 7 may be used as a support member and the first arm 5 may be used as a movable arm.

The invention claimed is:

1. An arm fixing device that fixes a movable arm to a support member, the movable arm being pivotally supported on the support member about a horizontal axis, the movable arm being driven to pivot about the axis by power of a servomotor, the arm fixing device comprising:

an attachment portion that is position-adjustable in a circumferential direction and detachably attached to one of the support member and the movable arm;

a pair of protrusion fixing portions that, in a state where the attachment portion is attached to one of the support member and the movable arm, extend in a radial direction with respect to the axis and that are disposed at positions interposing a protruding portion therebetween in the circumferential direction, the protruding portion being provided on another of the support member and the movable arm and protruding in the axis direction; and a connecting portion that connects distal ends of the protrusion fixing portions to each other.

2. The arm fixing device according to claim 1, further comprising:

a window portion penetrating in the axis direction between the attachment portion and the connecting portion.

3. The arm fixing device according to claim 1, wherein the attachment portion includes an elongated hole extending in a pivot direction of the movable arm, and an attachment position of the attachment portion with respect to one of the support member and the movable arm is changed by changing a position at which a fastener, which passes through the elongated hole and which is fastened in an attachment portion screw hole provided in one of the support member and the movable arm, passes through the elongated hole.

4. The arm fixing device according to claim 1, further comprising:

a fixing portion screw hole that penetrates each of the protrusion fixing portions in a direction intersecting the radial direction, and a screw member fastened in the fixing portion screw hole.

5. The arm fixing device according to claim 1, wherein the support member comprises a base member.

6. The arm fixing device according to claim 1, wherein the support member comprises another movable arm.

* * * * *